Sept. 28, 1926.
G. C. WATKINS
DEVICE FOR PULLING BEARING CUPS FROM HUBS
Filed July 30, 1924
1,601,660
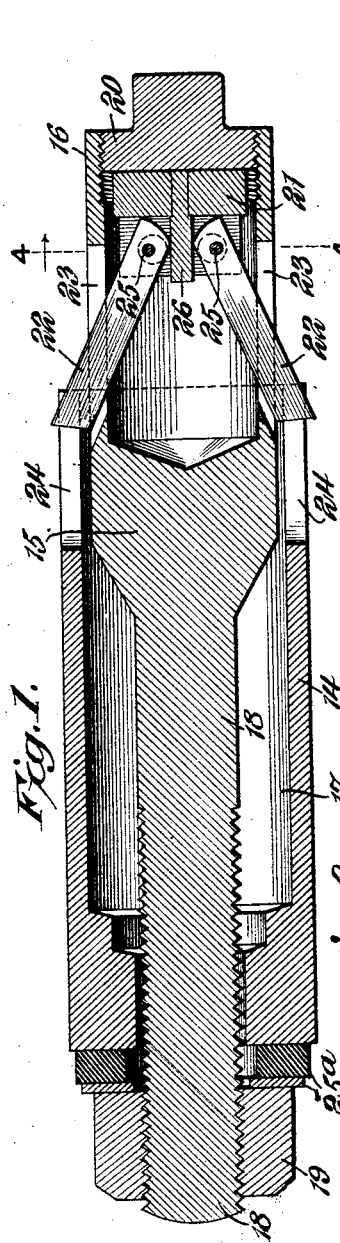
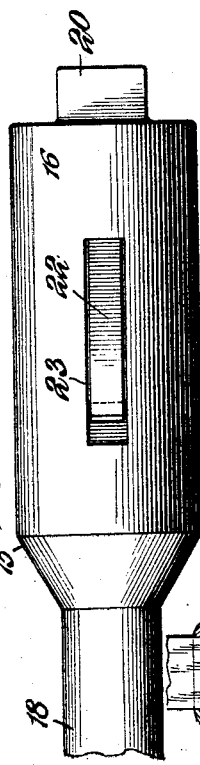
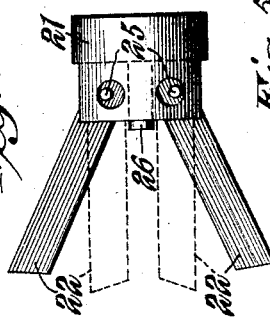
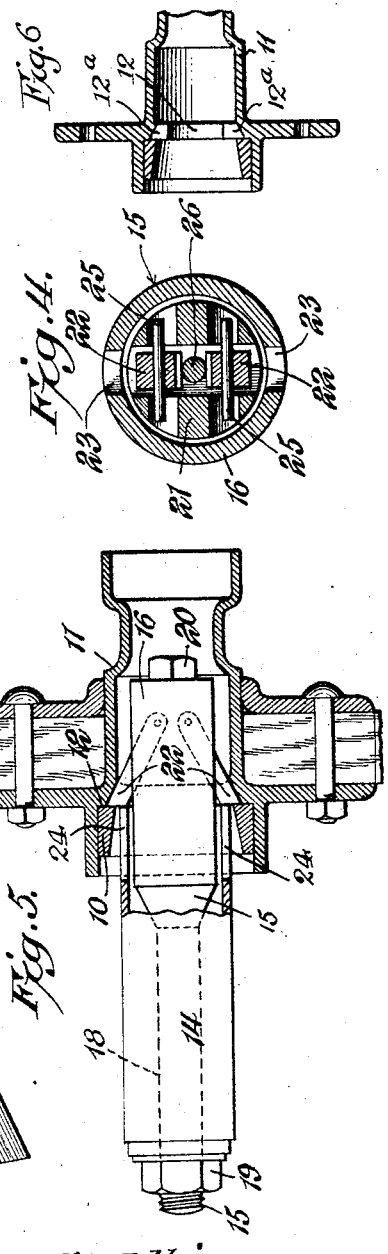
Grover C. Watkins, INVENTOR,
WITNESSES
BY
ATTORNEY Patented Sept. 28, 1926.

1,601,660

UNITED STATES PATENT OFFICE.

GROVER C. WATKINS, OF PADUCAH, KENTUCKY.

DEVICE FOR PULLING BEARING CUPS FROM HUBS.

Application filed July 30, 1924. Serial No. 729,127.

This invention relates to implements for pulling bearing cups, bushings, etc. from parts of structures in which they may be housed, and is particularly adapted for pulling bearing cups from the hubs of automobile wheels.

The bearing cups or rings of the hubs of certain automobiles, Ford automobiles in particular, sometimes are exceedingly difficult to remove by the use of ordinary tools, due to the peculiar construction of the wheel hubs and the manner in which the bearing cups are fitted therein, and it is therefore the purpose of this invention to provide a simple, compact, easily operated, efficient tool by means of which the bearing cups may be removed expeditiously and with relatively slight effort, and without damage to the cup.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a longitudinal section through a tool embodying the novel and essential features of this invention;

Figure 2 is an elevation of the stock or pulling member of the tool;

Figure 3 is an elevation showing the construction and assembly of the gripping dogs carried by the stock or pulling member and illustrating their two positions in full and dotted lines;

Figure 4 is a transverse section on the line 4—4 of Figure 1;

Figure 5 is a view partly in elevation and partly in section, showing the manner in which the tool is used to remove a bearing cup from a wheel hub;

Figure 6 is a diametric section through the hub.

As shown in Figure 5 of the drawings, my improved tool is particularly adapted for pulling a bearing cup or ring 10 from the casing of a wheel hub 11, the bearing cup being tightly fitted within an enlargement at an end of the hub in abutting relation to a shoulder 12, and thus being difficult to remove by the use of ordinary tools, for the reason that access to its inner edge, whereby it may be driven from the hub, is denied by the shoulder 12. Damage to the bearing cup, such as is likely to occur by hammering thereon, must be avoided, and it is practically impossible by the use of screw drivers, chisels or like tools to secure even pressure on opposite sides of the cup simultaneously, which must be done if the cup is to be removed with facility and without injuring the same.

The detailed construction of my improved tool for removing cup or ring 10 with ease and without damage is illustrated in Figures 1 to 4, from which figures it will be observed that said tool consists essentially of a cylindrical casing 14, and a stock or pulling member 15, the latter including an enlarged cylindrical portion or head 16 adapted to be received within the bore 17 of the casing 14 at one end thereof and having a threaded shank 18 extending through the casing 14 beyond the other end thereof where it is equipped with a nut 19. In other words, the stock or pulling member extends throughout the casing 14.

The enlarged portion or head 16 of the pulling member 15 is hollow and closed at its outer end by an adjustable plug 20, which plug serves to retain within said enlarged portion a block 21, to which is pivotally connected the inner ends of a pair of dogs 22, 22, the free ends of which are caused to extend exteriorly of the enlarged portion 16 through diametrically opposite slots 23, 23, therein, and are adapted to travel through similar slots 24, 24 in the casing 14 when the enlarged portion or head 16 of the stock is moved into the casing, as is clear from the showing of Figure 1. The adjustable plug 20 limits the outward movement of the block 21.

In the use of my improved tool for pulling a bearing cup 10 from a hub, as shown in Figure 5, for example, with the tool held in an upright position, nut 19 is adjusted along shank 18 to permit stock 15 to be moved outwardly relative to casing 14 until the free ends of the dogs 22, 22 are clear of the adjacent end of the casing. At this time the dogs are then in a contracted position, as indicated in dotted lines, Fig. 3. The tool then is positioned as shown in Figure 5 with the inner end of the casing 14 abutting shoulder 12 which extends inwardly and forms a bearing for the head 16, and which is provided with diametrically opposed slots 12ª, through which the dogs 22, 22 project to engage the cup 10, whereupon the nut 19 is adjusted along shank 18 into engagement with a washer or washers 25ª disposed against the outer end of the casing, which results in stock 15 being drawn within the casing and also in the firm engagement of the free ends of the dogs with the bearing cup 10 and the consequent pulling of the latter from the hub, the pressure set up by nut 19 reacting through the casing 14 from the shoulder 12 to remove the bearing cup from the hub and, as is thus manifest, the pulling forces are evenly distributed around the shoulder 12, and damaging blows on the bearing ring cup are entirely eliminated.

The pivotal connections between the dogs 22 and the block 21 consist of pins 25, 25 fitting more or less tightly in the dogs and extending quite loosely through relatively large openings in the block so that when stress is set up in the dogs during manipulation of nut 19 to pull a bearing ring from a hub, the inner ends of the dogs engage the adjacent face of the block 21 and also a pin 26 fixed centrally in the block so that such stress is received by the block rather than the pins 25, 25.

An important feature of this invention is that it puts the pressure required for removing the bearing cup on the inner margin of the hub in direct line with the main body of the hub.

From the foregoing description considered in connection with the accompanying drawings, it is believed that the construction, operation and advantages of my improved tool will be readily understood. It is desired to point out, however, that various changes and desirable additions may be made in and to the structural arrangement shown within the spirit and scope of my invention, as defined in the appended claims.

I claim:—

1. A pulling tool for pulling bearing cups from hubs, comprising a substantially cylindrical casing having one end slotted and adapted to engage the interior of the hub, a pulling member arranged to project through the casing at both ends, threaded means at one end of the pulling member to engage said casing to progressively move the pulling member relatively to the casing, and means at the other end of the pulling member located beyond the end of the casing and movable through the slotted portion of the casing to engage the bearing cup to be pulled.

2. A pulling tool of the class described, comprising a slotted casing adapted to be passed through a device to be pulled into engagement with a shoulder of a structure by which the device is carried, a stock, threaded means for moving said stock through said casing, and dogs carried by said stock engageable with the article to be pulled, said dogs being adapted to enter the slots in said casing.

3. A pulling tool of the class described, comprising a casing, a stock including a head disposed in one end of said casing, and a shank extending through the casing beyond the other end thereof, means threaded on said shank and cooperating with the casing to move the head of the stock into the casing, and means within the head of said stock and extending exteriorly of said head to engage the article to be pulled.

4. A pulling tool of the class described, comprising a casing, a stock movable through said casing, means for so moving said stock, a block retained within said stock, and dogs pivotally connected to said block and extending exteriorly of said stock through slots therein for engagement with an article to be pulled.

5. A pulling tool of the class described, comprising a casing, a stock movable through said casing, means for so moving said stock, a block retained within said stock, and dogs pivotally connected to said block and extending exteriorly of said stock through slots therein for engagement with an article to be pulled, the pivotal connections between said dogs and said block permitting the dogs to move longitudinally whereby their inner ends may contact with said block when stress is set up in the dogs during pulling of an article thereby to relieve said pivotal connections of strains.

6. A pulling tool of the class described, comprising a casing, a stock movable through said casing, means for so moving said stock, a block retained within said stock, dogs pivotally connected at their inner ends to said block and extending at their outer ends exteriorly of said stock through slots therein for engagement with an article to be pulled, and a pin fixed to said block acting to separate the inner ends of said dogs, the pivotal connections between said dogs and said block permitting the dogs to move bodily whereby their inner ends may contact with said block and said pin when stress is set up in the dogs during pulling of an article thereby to relieve said pivotal connections of strains.

In testimony, that I claim the foregoing as my own, I have hereto affixed my signature.

GROVER C. WATKINS.